Nov. 13, 1928.
W. E. ROACH ET AL
ARM REST
Filed Oct. 1, 1927
1,691,613
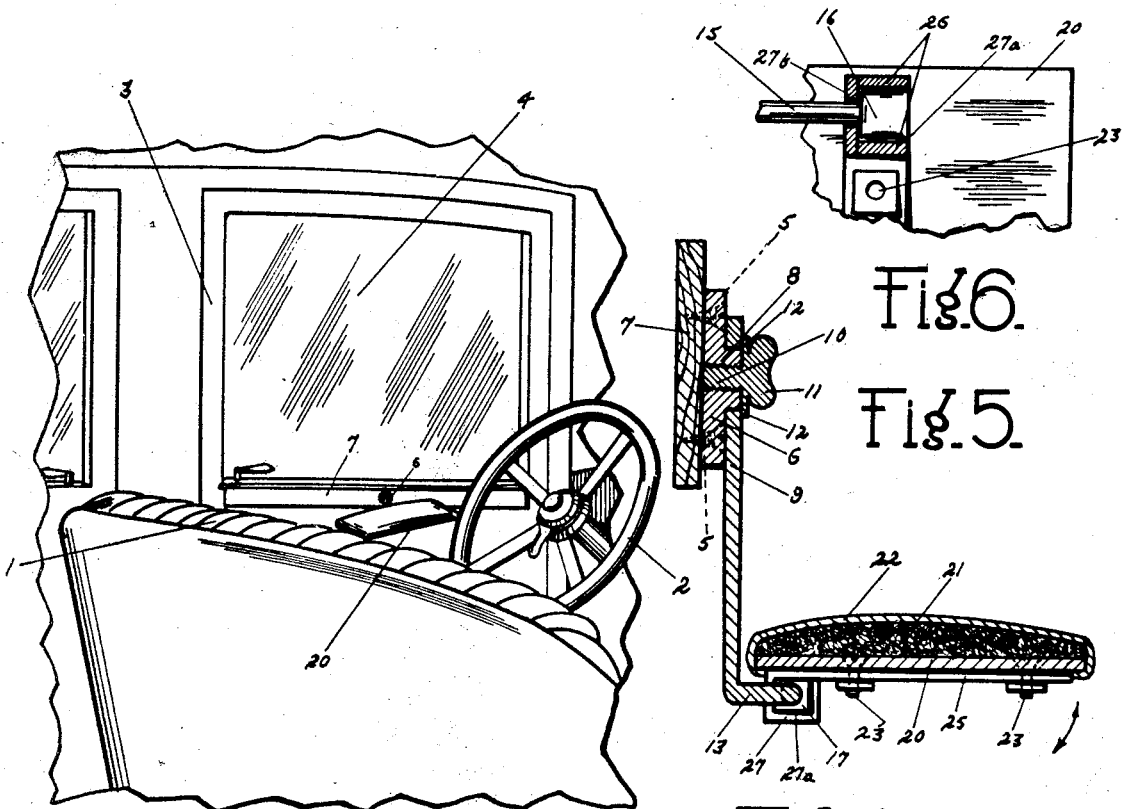
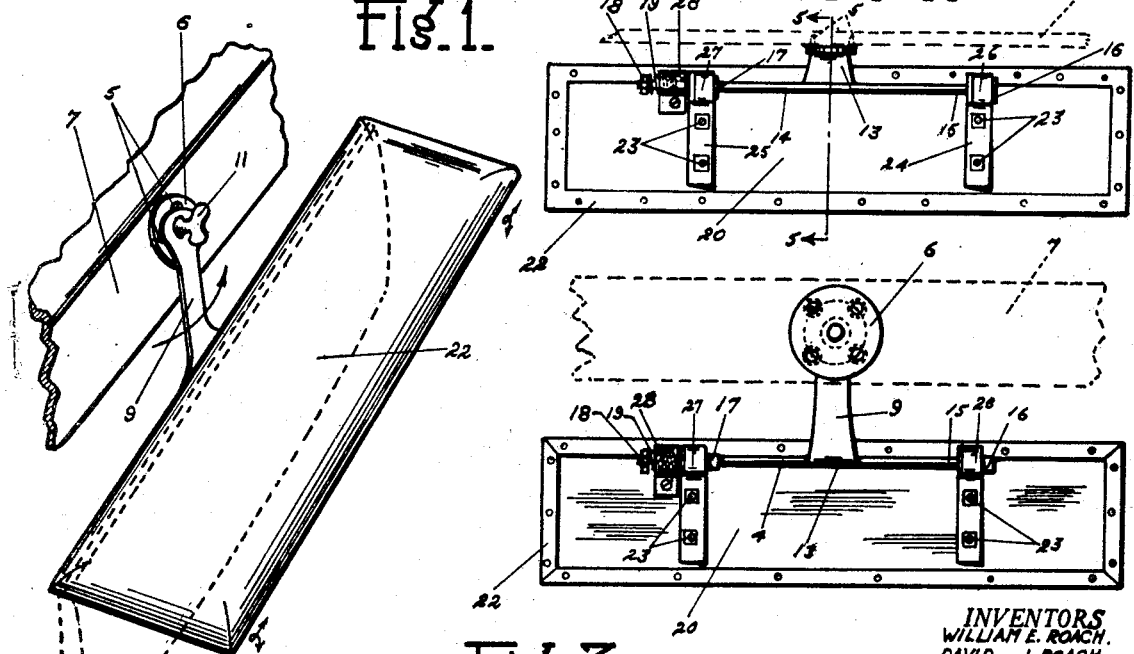
INVENTORS
WILLIAM E. ROACH.
DAVID J. ROACH.
ATTORNEYS.

Patented Nov. 13, 1928.

1,691,613

UNITED STATES PATENT OFFICE.

WILLIAM E. ROACH AND DAVID J. ROACH, OF OWEGO, NEW YORK.

ARM REST.

Application filed October 1, 1927. Serial No. 223,454.

Our invention relates generally to arm rests and particularly to a tiltingly adjustable arm rest which also may be hinged downwardly out of operative position.

We have illustrated our arm rest in connection with an automabile wherein it is particularly adaptable for use by the driver. We wish it understood, however, that the device is not to be limited to such use or in such combination as it is susceptible to a wide variety of uses such as for instance in railway and Pullman cars.

The principal object of our invention is to provide an arm rest which may be tilted to any desired angle to suit the comfort of the user.

Another object is to provide means for quickly and easily bringing the arm rest to operative position or rocking it on its pivot to inoperative position where it is entirely out of the way.

A still further object is to provide an arm rest of this character which is of few parts, simple and economical in construction and which can be placed for use in relatively crowded places without interference with adjacent parts. This makes the arm rest particularly adaptable for use by the driver of an automobile where it can be utilized to great advantage without interference with the steering wheel or other working parts of the car.

Still another object lies in the provision of novel securing and pivoting means for the arm rest.

Other objects and advantages in details of construction and operation will be apparent as the description now proceeds, reference being had to the figures of the accompanying drawing wherein like reference numerals indicate like parts.

In the drawing:—

Figure 1 is a perspective view of a portion of the interior of an automobile illustrating our improved arm rest in connection with the driver's seat thereof.

Figure 2 is a detail perspective view of the arm rest in operative position.

Figure 3 is a detail rear view of the arm rest hinged downwardly to inoperative position.

Figure 4 is a detail bottom view of the arm rest in its operative position.

Figure 5 is a cross sectional view taken on the line 5—5 of Figure 4.

Figure 6 is a detail, partly in section, illustrating part of the locking device.

The reference numeral 1 indicates the driver's seat of an automobile provided with the usual steering wheel 2 and door 3, including the window 4. Our improved arm rest is particularly adaptable for use on the door 3, directly below and centrally of the window 4, in convenient position for the arm of the driver of the car. To this end we secure as by the screws 5, a fastening plate 6 to the frame 7 of the door forming the support. This plate 6 is provided centrally with a projecting boss 8 to form a bearing upon which is pivotally mounted the upper end of a bracket arm 9. The boss 8 is provided with a central, hollow threaded opening adapted to receive the threaded stem 10 of a locking nut 11, the flanges 12 of which project beyond the edges of the boss 8 and overlie the upper end of the bracket arm 9. Obviously therefore the bracket arm 9 may be swung on its pivot on the boss 8 parallel with the supporting frame 7 and securely locked, if desired, in any adjusted position by means of the nut 11. Of course if desired, the nut 11 may be loosened slightly to permit the bracket 9 to swing freely on the boss 8.

The lower end of the bracket arm 9 is bent angularly as at 13 and is provided at its free end with a shaft 14 extending laterally of such free end and on either side thereof. This shaft 14 is preferably integral with the end 13 of the bracket arm but of course may be made separate therefrom and rigidly secured thereto if desired. One end 15 of the shaft is provided at its extremity with a stop member in the form of a rectangular block 16 secured thereto. A similarly shaped stop member 17 is provided on the shaft adjacent its opposite end but spaced inwardly therefrom somewhat. The extremity of this end of the shaft 14 is threaded to receive a nut 18 and just inside the nut 18, a coil spring 19 encircles the shaft. The purpose of these parts will be more fully described.

The arm rest proper comprises the arm pad 20, the top and edges of which are provided with a suitable padding 21 covered by cloth, leather or other suitable upholstering material 22. Secured to the underside of the pad 20, as by the screws 23, are spaced strap members 24 and 25. The inner free ends of these strap members are bent as shown clearly in Figure 5 to provide seats 26 and 27 with rectangular openings 27ª in one side thereof adapted to receive the stop members 16 and 17 when the arm rest is in the position shown in Figure 5. As evident in Figure 6, the sides of these seats opposite the rectangular openings 27ª are closed except for openings 27ᵇ just large enough to permit the passage of the shaft 14 therethrough. The coiled spring 19 lies between the nut 18 and the adjacent wall of the seat 27. A guard member 28 may encircle the spring 19 adjacent the seat 27, both to protect the spring against dirt and also to act as a limiting stop for the nut 18 when the arm rest is shifted laterally in a manner to be described. This guard may of course be separate from said seat or integral therewith. It will be clear also that the nut 18 acts as an adjustment for the tension of the spring 19.

From the foregoing, it will be seen that with the parts in assembled position, the spring 19 normally urges the arm pad to the left in Figures 3 and 4, thus resiliently holding the seats 26 and 27 in engagement with the stop members 16 and 17 on the shaft 14. By virtue of the rectangular shape of the stops 16 and 17 and of the openings 27ª in the seats 26 and 27, it will be clear that in one position of the arm pad, namely the arm supporting position shown in Figures 4 and 5, the seats will move over and enclose the stop members 16 and 17 in which position the arm rest is locked against pivotal movement on the bracket arm. By moving the arm pad 20 to the left in Figures 3 and 4, however, the seats 26 and 27 will be removed from the stop members and in such position the arm pad may be pivoted downwardly on the shaft 14 to the position shown in dotted lines in Figure 2 and in full lines in Figure 3. In such position, the seats 26 and 27 do not move over the stop members because of the rectangular shape but merely engage against the edges thereof, the tension of the spring 19 tending to frictionally hold them in such position. When it is desired to raise the arm rest to arm supporting position again, it may be tilted upwardly against the friction of the spring 19 and when it reaches a horizontal position as shown in Figure 5, the seats 26 and 27 will slide over the stop members 16 and 17, urged by the tension of the spring 19, whereupon the arm rest is again locked in operative position.

By hinging the arm rest downwardly to inoperative position, we avoid interference with the steering wheel of the automobile, which in modern construction is often quite close to the door of the car, and we likewise eliminate the double thickness presented as in the case of an arm rest which folds upwardly. This feature therefore adds great simplicity and convenience to the device.

Of course, changes may be made in details of construction and arrangement of parts without departing from the spirit and scope of our invention. We do not limit ourselves therefore to the exact form shown and described other than by the appended claims.

We claim:—

1. An arm rest comprising a bracket suspended from a support, an arm pad pivoted to said bracket, means for locking said pad in arm supporting position at right angles to said bracket, said pad being rockable on its pivot, out of arm supporting position, and means for frictionally retaining said pad in said last named position.

2. In combination with a support, a bracket pivoted thereon for tilting adjustment parallel with said support, and an arm pad pivoted to said bracket and adapted to extend at right angles to said support and to swing to a position parallel therewith, and means for automatically locking said pad in said first named position.

3. In combination with a support, a bracket pivoted thereon for tilting adjustment parallel with said support, and an arm pad pivoted to said bracket and adapted to extend at right angles to said support and to swing to a position parallel therewith, and means for positively automatically locking said pad in said first named position, and means for frictionally locking said pad in said second named position.

4. In combination with a support, a bracket pivoted thereon for tilting adjustment parallel with said support, an arm pad pivoted to said bracket and adapted to extend at right angles to said support and to swing to a position parallel therewith, means on said pad and said bracket for automatically locking said pad in said first named position, said pad being slidable on said bracket for unlocking said pad and permitting its movement to said second named position.

5. In combination with a support, a bracket pivoted thereon for tilting adjustment parallel with said support, an arm pad pivoted to said bracket and adapted to extend at right angles to said support and to swing to a position parallel therewith, said pad being slidable on said bracket for unlocking said pad and permitting its movement to said second named position, and means including seats on said pad and cooperating stop members on said bracket, and a spring normally urging said seats and said stop members into engagement for automatically locking said pad in said first named position.

WILLIAM E. ROACH.
DAVID J. ROACH.